H. KILLAM.
Carriage Axle.

No. 110,766. Patented Jan. 3, 1871.

Witnesses:

Henry Killam
Inventor
By his Attorney

United States Patent Office.

HENRY KILLAM, OF NEW HAVEN, CONNECTICUT.

Letters Patent No. 110,766, dated January 3, 1871.

IMPROVEMENT IN CARRIAGE-AXLES.

The Schedule referred to in these Letters Patent and making part of the same.

*To all whom it may concern:*

Be it known that I, HENRY KILLAM, of New Haven, in the county of New Haven and State of Connecticut, have invented a new Improvement in Carriage-Axles; and I do hereby declare the following, when taken in connection with the accompanying drawing and the letters of reference marked thereon, to be a full, clear, and exact description of the same, and which said drawing constitutes part of this specification, and represents in—

Figure 1:
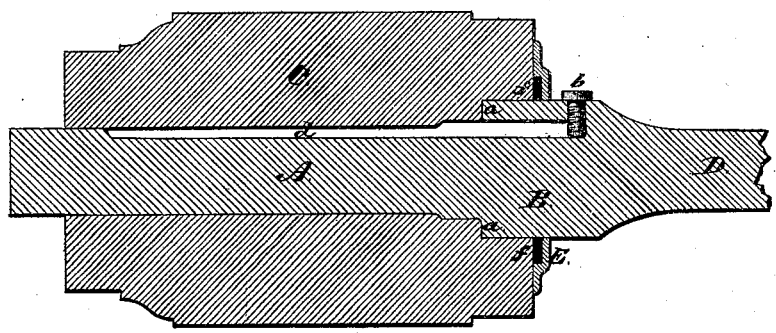

Figure 1, a longitudinal central section of the hub and axle; and in

Figure 2:

Figure 2, a transverse section of the axle.

This invention relates to an improvement in the construction of carriage-axles, the object being to facilitate the lubricating of the axle; and The invention consists in the construction of the axle with an enlargement at the shoulder, which said enlargement sits into the hub, and the axle constructed with a longitudinal groove upon its upper side running into the said enlargement, with an opening from the outside of the axle into the said groove, so that the lubricating material may be poured into the said groove through the said opening.

My invention also consists in combining with the axle, constructed as above, a packing upon the outside of the hub around the enlarged portion of the axle to prevent the escape of the lubricating material.

A is the axle, at its inner end formed with an enlarged portion, B, and so as to form a shoulder, *a*, against which the hub bears.

The said enlarged portion B extends of equal diameter from the shoulder *a* to a short distance outside the hub, and is then run into the square portion D of the axle.

The enlarged portion B extends into the hub C, as seen in fig. 1, so that the bearing of the wheel laterally comes within the hub.

Upon the upper side of the axle A, I form a groove, *d*, running to near the outer end of the hub, and back into the enlarged portion B to a distance outside the hub, where a communication is made with the said groove by boring into the groove and fitting with a screw, *b*, or other means of closing, as seen in fig. 1.

When it is desirable to lubricate the axle, remove the closing device *b* and pour in the lubricating material until the groove is filled. Then close the device *b*, and a sufficient quantity of lubricating material is poured within the wheel to supply the lubricator for a longer time than can be placed thereon when the wheel is removed, and the bearing-shoulder *a*, coming within the hub, requires no lubricating material upon the outside.

This prevents the dust or dirt collecting around the bearing from absorbing the lubricating material.

To prevent the escape of any portion of the lubricating material, I make a packing around the enlarged portion of the axle by fitting a cap, E, to the inner end of the hub, and within the cap I arrange a packing-ring, *f*, which, by the cap, is held tight around the axle, and thus prevents the possibility of escape of the lubricating material.

By the construction thus described, all necessity for removing the wheel is avoided, and all possibility of dust or grit getting into the axle is prevented.

I claim as my invention—

1. The carriage-axle A, constructed with the enlarged portion B and shoulder *a* within the hub, and provided with the groove *d*, and communication *b* with the said groove outside the hub, as and for the purpose described.

2. In combination with the axle A and its enlarged portion B within the hub, the packing-cap E, attached to the inner end of the hub, in the manner and for the purpose set forth.

HENRY KILLAM.

Witnesses:
A. J. TIBBITS,
J. H. SHUMWAY.